H. & E. ECKSCHLAGER.
DISPLAY APPARATUS.
APPLICATION FILED MAY 8, 1912.

1,099,431.

Patented June 9, 1914.

7 SHEETS—SHEET 1.

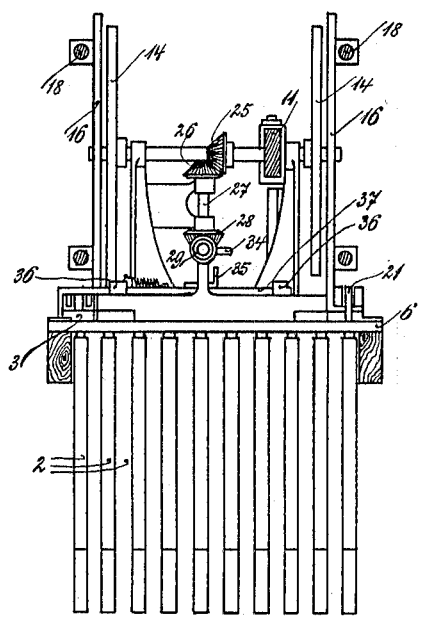

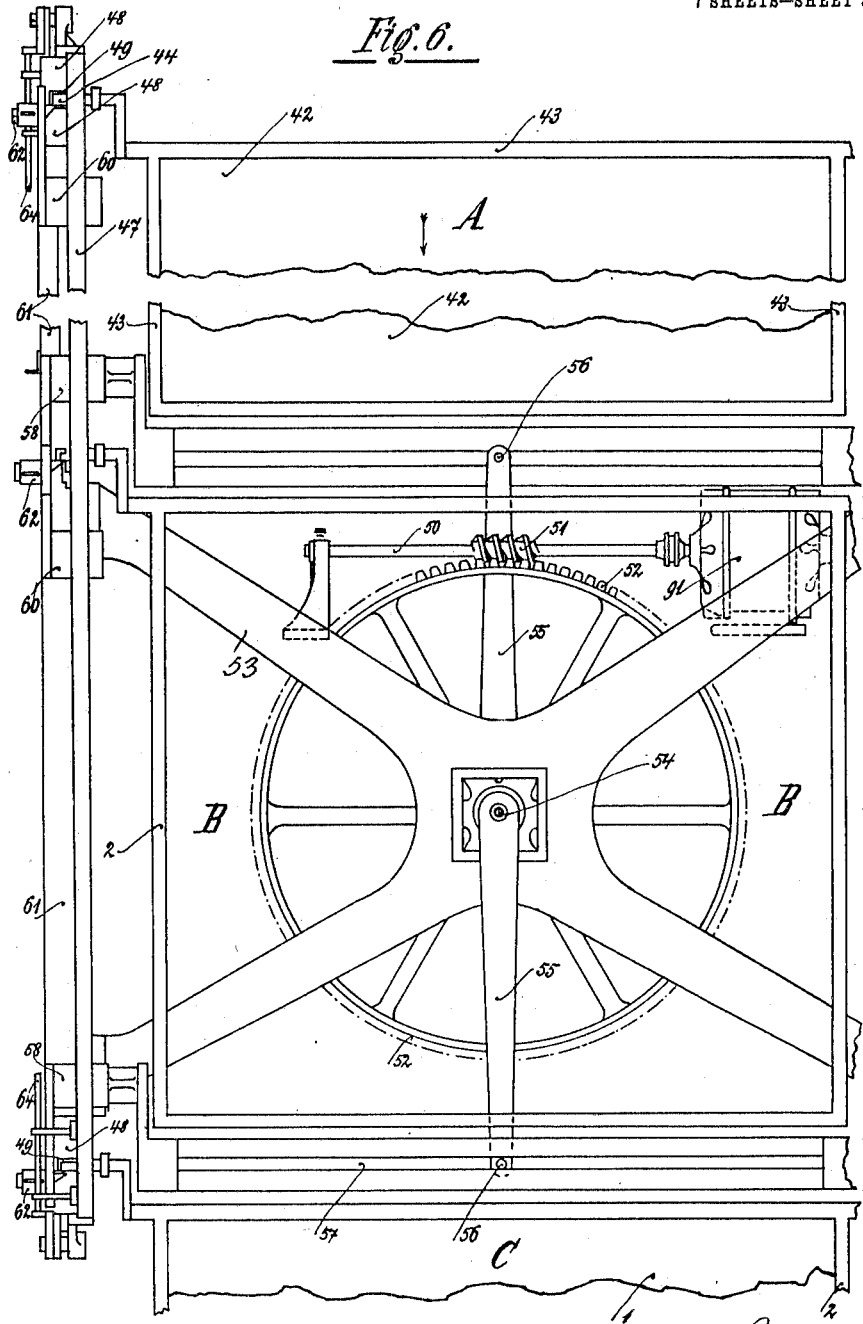

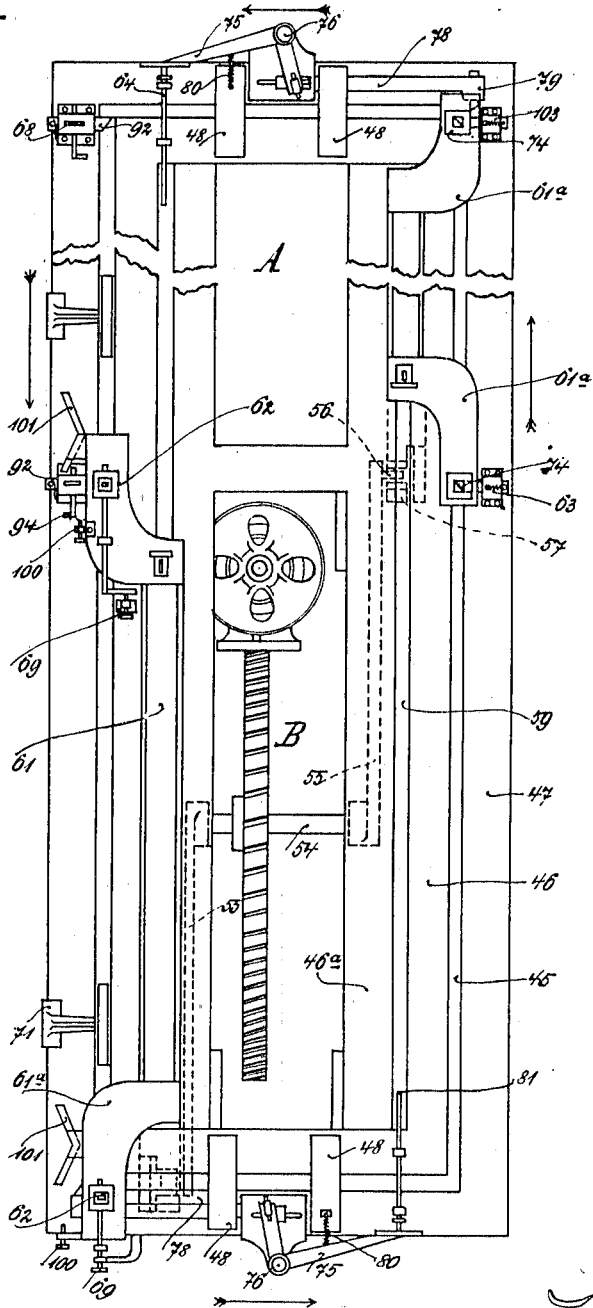

H. & E. ECKSCHLAGER.
DISPLAY APPARATUS.
APPLICATION FILED MAY 8, 1912.
1,099,431.
Patented June 9, 1914.
7 SHEETS—SHEET 5.
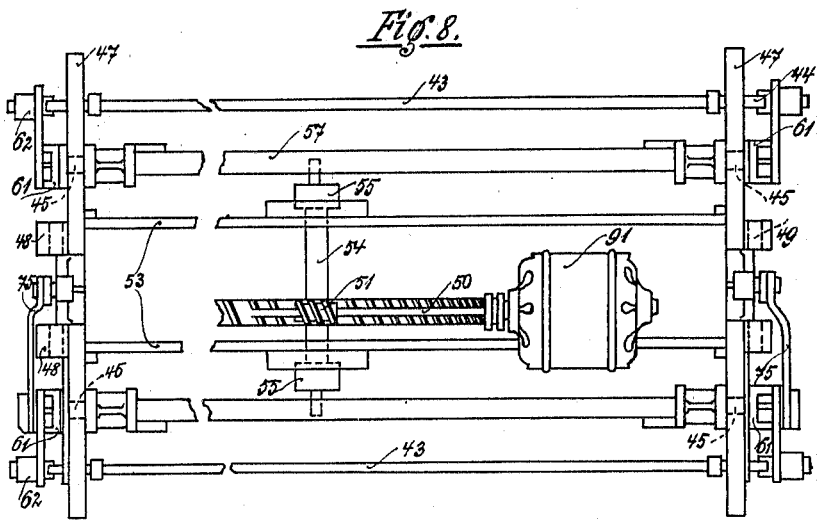
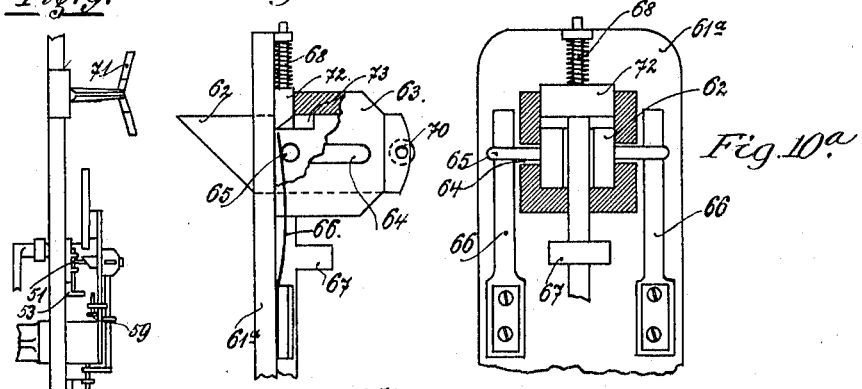
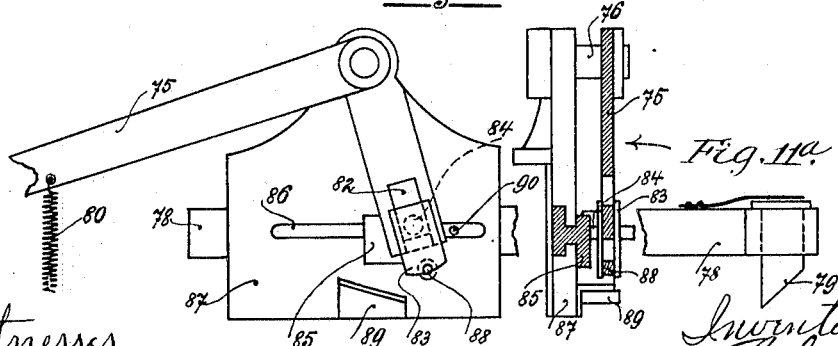

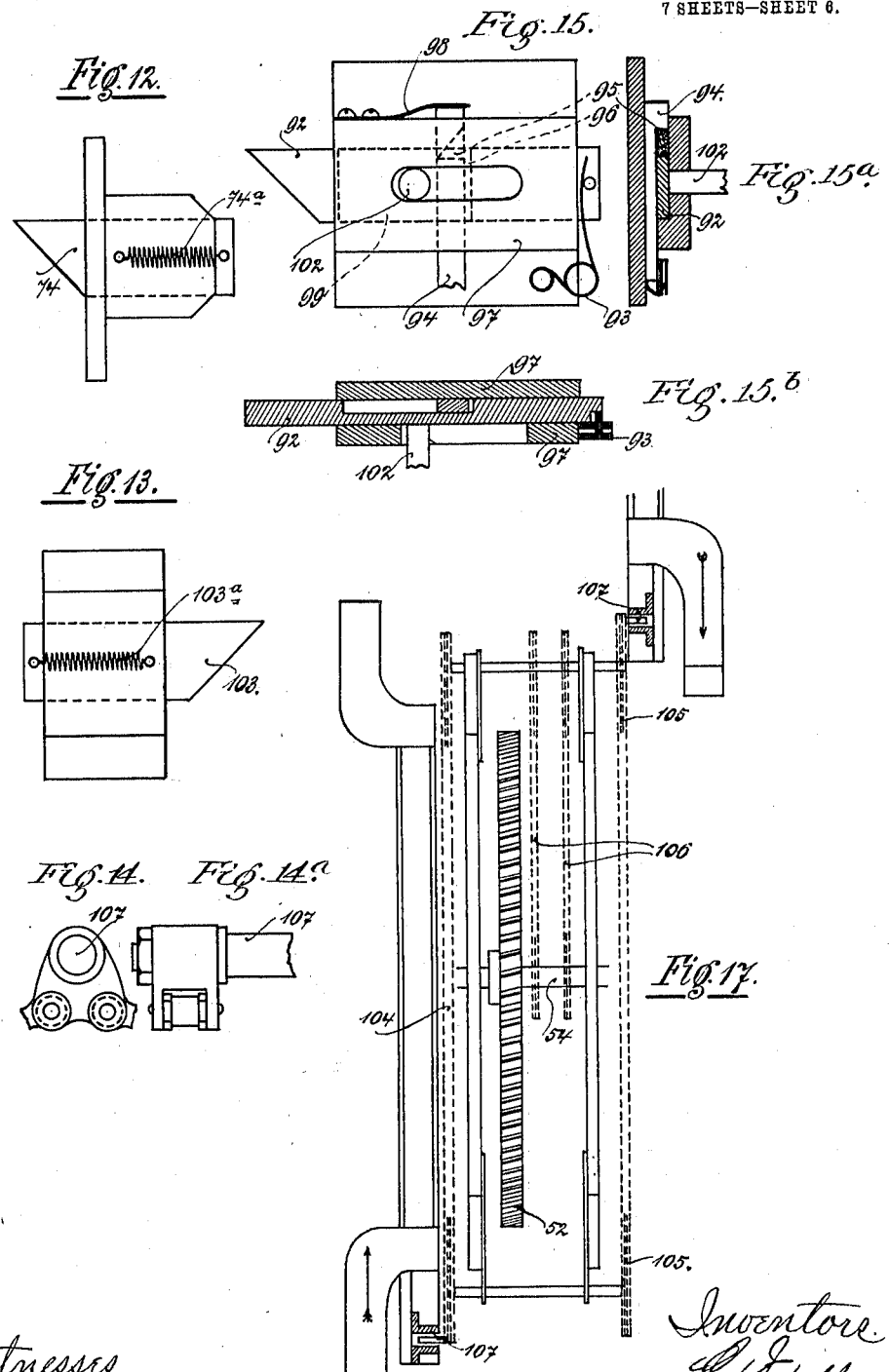

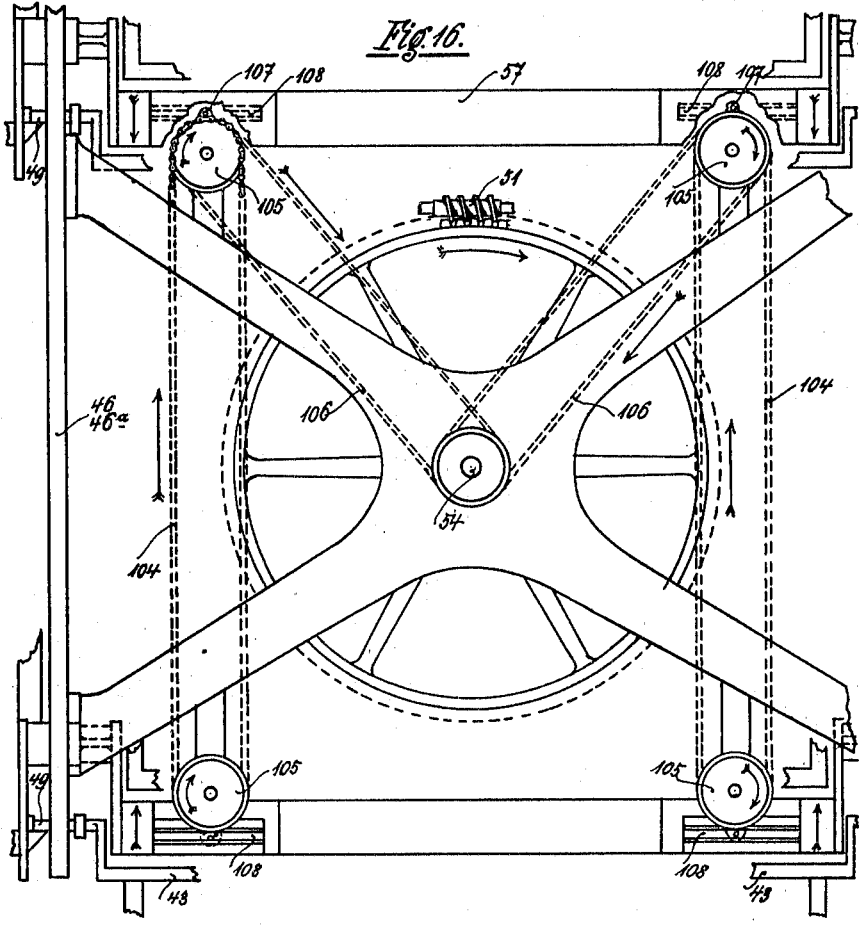

UNITED STATES PATENT OFFICE.

HANS ECKSCHLAGER AND EMIL ECKSCHLAGER, OF VIENNA, AUSTRIA-HUNGARY.

DISPLAY APPARATUS.

1,099,431.

Specification of Letters Patent.

Patented June 9, 1914.

Application filed May 8, 1912. Serial No. 695,994.

*To all whom it may concern:*

Be it known that we, HANS ECKSCHLAGER and EMIL ECKSCHLAGER, subjects of the Emperor of Austria-Hungary, and residents of Vienna, Austria-Hungary, have invented certain new and useful Improvements in Display Apparatus, of which the following is a full, clear, and exact specification.

Our invention relates to display apparatus of the general type in which pictures, placards, advertisements and like objects, are conveyed in a continuous course to be successively presented in display position and removed therefrom.

The principal object of the invention is to provide an apparatus of this character, embodying certain novel features and combinations of elements, all as more fully hereinafter described, and particularly defined by the appended claims.

The invention is illustratively exemplified in the accompanying drawings, wherein—

Figure 1:
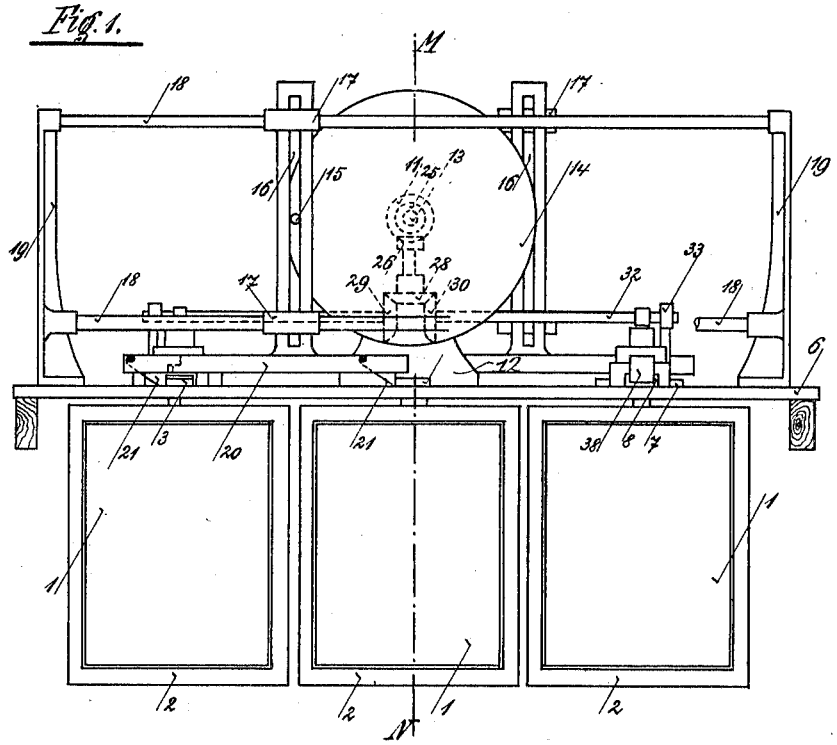
Figure 2:
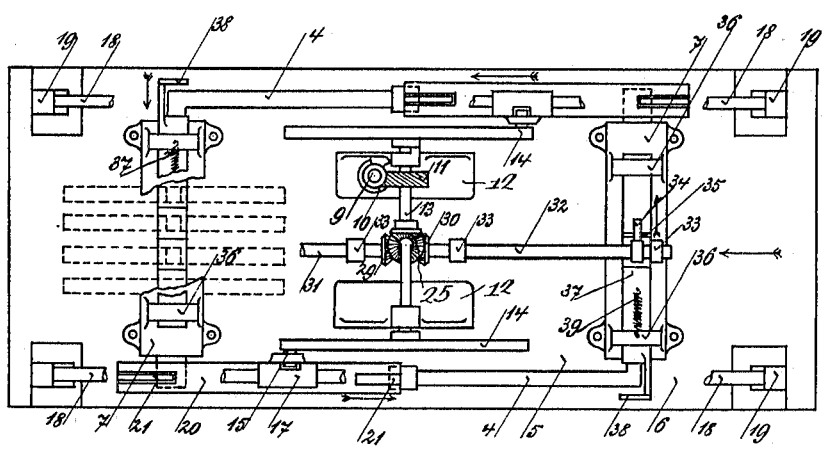

Figure 1 is a front elevational view of the preferred form of apparatus; Fig. 2 is a top plan view thereof, certain parts being broken away; Fig. 3 is an end elevational view thereof; Fig. 4 is a partial, vertical sectional view, substantially on the line M—N of Fig. 1; Fig. 5 is a detail elevational view of certain conveying mechanism, shown in Fig. 1; Fig. 6 is a front elevational view, parts being broken away, of a modified form of invention in which the objects to be displayed are conveyed in a vertical plane; Fig. 7 is a side elevational view thereof; Fig. 8 is a top plan view thereof; Fig. 9 is a detail fragmentary view, taken from the left hand side of Fig. 7; Fig. 10 is a side elevational view, partly in section, of part of the mechanism employed in conveying the objects to be displayed, at the front of the apparatus shown in Fig. 6; Fig. 10$^a$ is a rear elevational view, partly in section, of the device shown in Fig. 10; Fig. 11 is a front elevational view, parts being broken away, of part of the mechanism employed in conveying the objects to be displayed, at the top and bottom of the apparatus shown in Fig. 6; Fig. 11$^a$ is a side elevational view, partly in section, of the device shown in Fig. 11; Fig. 12 is a plan view of part of the mechanism employed in conveying objects to be displayed, at the back of the apparatus shown in Fig. 6; Fig. 13 is a similar view of a supporting latch at the back of the apparatus shown in Fig. 6; Figs. 14 and 14$^a$ are detail views, at right angles to each other, of parts of mechanism used in connection with a modified form of the invention shown in Figs. 16 and 17; Fig. 15 is a side elevational view of a supporting latch at the front of the apparatus shown in Fig. 6; Figs. 15$^a$ and 15$^b$ are cross sectional views at right angles to each other, of the device shown in Fig. 15; Fig. 16 is a front elevational view with parts broken away, of a modified form of invention employing a chain drive; and Fig. 17 is a side elevational view of Fig. 16.

In carrying our invention into practice we provide a continuous course or way, preferably of oblong configuration, along or through which the objects to be displayed are conveyed. In the longer sides of the way the objects are preferably advanced singly and successively into and out of display position, while in the shorter sides of the way, the objects are preferably moved in the form of piles or stacks, suitable means being provided to effect the movement, at proper times and in predetermined sequence, of the successive objects and of the stacks.

In the interest of simplicity of expression it will be assumed, in the following specification, that the objects to be displayed are advertisements or advertising placards, but it will of course be understood that our invention is not limited to this use solely.

Referring by reference characters to the accompanying drawings, and particularly to Figs. 1 to 5 thereof, showing an apparatus in which the placards are caused to travel in a horizontal plane, the numeral 1 designates a suitable placard held in a frame 2, provided with an enlarged head 3. To provide a continuous course or way through which the frames 2 may be conveyed, we connect together by brackets 7, two horizontally arranged plates 5 and 6, having a space 4 between them, which forms the continuous course through which the frames 2 travel. The plates 5 and 6 which constitute the bed of the device are rectangular and lie in the same plane, the plate 5 being the smaller of the two and arranged within the plate 6 so that the way 4 is continuous and of equal width throughout its extent. The heads 3 of the frames 2 project up through the way 4 and rest on the upper faces of the plates 5 and 6. To permit the heads 3 to follow the way 4, the brackets 7 which are arranged over the shorter sides of the way 4, have their lower faces longitudinally grooved as indicated at 8, thus affording ample space for the passage of the heads under the brackets. Projecting vertically up in the apparatus is a shaft 9 driven by any suitable source of power (not shown). At its upper end the shaft 9 carries a worm wheel 10, meshing with a worm 11 carried by a horizontal shaft 13, revolubly mounted in bearing brackets 12. Fixed to each end of the shaft 13 is a disk 14 provided with a crank pin or roller 15, the pins 15 being diametrically opposite to each other. Each pin 15 projects through the slot formed in a vertical, slotted post, 16, the lower end of which is connected to or formed integrally with a reciprocating bar or carriage 20, said bars being at opposite sides of the plates 5 and 6, and being designed to reciprocate over the longer parts of the way 4. Near the upper and lower end of each post 16 is a sleeve 17 taking over and guided by a longitudinal horizontal guide bar 18 supported by brackets 19 projecting upwardly from the outer corners of the plate 6. The bars 20 are provided near each end thereof with suitable means for yieldingly engaging the heads 3 of the frames 2, which project up through the longer parts of the way 4, the preferred means being clearly shown in Fig. 5. Formed in each bar 20 is a longitudinal slot 23 in which a housing 22 is slidable, the housing 22 being yieldingly held in position by a spring 24. Pivotally supported within each housing is a spring pressed dog 21, having its rear edge beveled, as shown. In the forward movement of the bars 20, the front vertical edges of the dogs 21 engage the heads 3 and feed the frames 2 forward an extent equal to the width of the frames. During the return movement of the bars, the beveled rear edges of the dogs ride over the heads 3 without moving the latter. If the forward movement of the dog meets with an obstruction, the springs 24 will permit the dogs to yield, thus preventing breakage of parts. In each of the shorter parts of the way 4, is a stack of placard carrying frames 2, these stacks being intermittently advanced in opposite directions, the direction of movement of each stack being indicated by the arrows in Fig. 2. To provide for the advance or feeding movement of the stacks, the following arrangement is employed: Carried by the shaft 13 intermediate its ends is a bevel gear wheel 25 in mesh with a similar gear wheel 26 carried at the upper end of a suitably supported, short vertical shaft 27. At its lower end this shaft 27 carries a bevel gear wheel 28, in mesh with similar gear wheels 29 and 30 fixed to the ends of shafts 31 and 32, which extend in a horizontal plane in opposite directions lengthwise of the plates 5 and 6, and are each supported in bearing brackets 33 projecting upwardly from the connecting brackets 7 and the plate 5. Owing to the arrangement of the driving gear for the shafts 31 and 32 the latter revolve in opposite directions. Fixed to the free outer end of each of the shafts 31 and 32, is a tappet 34 which, when the shaft to which it is fixed revolves, is adapted to engage a projection 35 formed on the upper face of a bar 37 slidable in guides 36 secured to or formed integrally with the upper faces of the brackets 7. Each of the slide bars 37 has a rearwardly extending cranked arm 38, and each bar 37 has connected thereto one end of a retractile spring 39, the opposite end of which is attached to one of the guides 36. The arrangement of the springs 39 is such that they have a normal tendency to draw the slide bars 37 in opposite directions. If transparent advertising placards are employed, we provide suitable illuminating means therefor, as shown in Fig. 4. In line with the intermediate placard in each of the front and rear longer parts of the way, 4, is a chamber or compartment 40, containing a source of illumination $40^a$, and having its upright walls 41 formed of frosted glass or the like, through which the light rays pass and thus illuminate the placards in front thereof.

The operation of the form of invention above described is as follows: In the showing of Figs. 1 and 2 it is assumed that the stack of placards in the left hand, shorter, part of the way 4 has been so far advanced that the foremost placard has reached the left hand end of the front, longer part of the way 4, while the stack of placards in the right hand, shorter part of the way has been sufficiently advanced that the last placard therein has reached the right hand end of the rear, longer part of the way 4. Each of the dogs 21 has its vertical edge in engagement with a head 3 of one of the frames 2. If, now, the shaft 13 is caused to revolve, rotary motion will also be imparted to the disks 14 and the shafts 31 and 32. As the disks 14 each make one half revolution, the pins 15 working in the slots of the vertical posts 16 will advance each bar 20, in opposite directions, to an extent equal to the width of one of the frames 2. The result of this motion will be that at the front of the apparatus the placard theretofore at the middle of the longer part of the way 4 (which is assumed to be in line with the display position of the apparatus) will be moved to the right hand end, while the placard theretofore at the left of this part of the way 4 will be moved to the center thereof. At the rear of the apparatus similar action takes place, but in a reverse direction. During this forward advance of the bars 20 and dogs 21, the shafts 31 and 32 have been revolving but their tappets 34 have been out of engagement with the projections 35 of the slide bars 37. As the disks 14 complete their revolution the bars 20 will be retracted to initial position, and during their return movement, the beveled edges of the dogs 21 will be forced inwardly by the heads 3 of the frames 2, and the latter will not be moved by the dogs. During the completion of the second half of the revolution of the disks 14, the tappets 34 will engage the projections 35 of the slide bars 37, moving each of the latter, in opposite directions, to an extent equal to the width of one of the heads 3. As the bars 37 are moved by the tappets 34, the cranked ends 38 engage behind the rearmost head of the placards in the stacks, respectively, thus causing an advance movement of each stack, in opposite directions, to the desired extent. When the tappets 34 leave the projections 35 the springs 39 retract the slide bars 37 to initial position, so that all the parts are again in position to repeat the sequence of steps above described. The placards move in the directions indicated by the arrows in Figs. 2, i. e. at the front of the apparatus the movement is from left to right, at the right hand side the movement is rearwardly, at the rear of the apparatus the movement is from right to left, and at the left hand side the movement is from rear to front. It will be understood that in each of the longer parts of the way 4 the placards are individually and successively conveyed from one position to another with their front face toward the observer, while in each of the shorter parts of the ways 4 the placards are stacked and moved in that form, the edges of the placards being toward the shorter sides of the device.

Referring to the modified form of the invention shown in Figs. 6 to 15<sup>b</sup>, it will be noted that the construction is one adapted for the up and down or vertical movement of the individual placards, while the stacks of placards are designed to be moved from front to rear and in the reverse direction in a horizontal path. The apparatus may be considered as being divided into three superimposed sections, A, B, and C, the upper and lower sections A and C, containing the stacks of placards, while the central section B is the display section. In this form of the invention, the placards 42 are carried by preferably rectangular frames 43, provided with laterally projecting pins or rollers 44, adapted to travel in a rectangular way 45, formed by the space between plates 46 and 47, which constitute the bed of the apparatus. The plates 46 and 47 are arranged in the same plane and at each of their shorter sides are connected together by brackets 48, the under faces of which are grooved out at 49 to permit of the unobstructed passage of the rollers 44 through the way 45. Each side of the apparatus is formed by a pair of the spaced plates 46 and 47, and the opposite pairs of plates are connected by front and rear spiders 53, only one of which is shown in the drawing at Fig. 6. The source of power for actuating certain parts of the mechanism is an electric motor 91, the horizontal shaft 50 of which carries a worm 51 meshing with the teeth of a worm wheel 52, fixed to a shaft 54 which is journaled in suitable bearings at the center of the spiders 53. Secured to opposite ends of the shaft 54 and extending in diametrically opposite directions are crank arms 55 each of which carries a pin 56 near its outer end. Slidable in vertical slots 59 between the inner edges of the plate 46 and the outer edges of vertical plates 46<sup>a</sup>, are the cranked ends 58 of reciprocatory, longitudinally slotted carriages 57, the reciprocation of said carriages being effected by the action of the pins 56 in the slots in said carriages. The carriages 57 are reciprocable at the front and the rear of the apparatus, and each thereof carries a sliding bar or rail 61 which is reciprocable longitudinally of the apparatus, said bars being guided in their reciprocatory movements in the vertical slots 59. Secured to or formed integrally with the ends of each rail 61 are oppositely disposed, curved heads 61<sup>a</sup> provided with suitable means whereby the frames 43 are moved in opposite directions in the front and rear longer parts of the way 45, the means provided on the front rail being designated generally by the numeral 62, and the means on the rear rails being designated generally by the numeral 74. The means for moving the frames, carried by each rail, are spaced apart an extent corresponding to one half the length of the longer part of the way 45, this being the distance traversed by the rail during one half the revolution of the worm wheel 52.

The means for advancing the stacks of frames in the upper and lower horizontal parts of the way 45, consist of pusher bars 78, each thereof having a spring pressed beveled pin 79 at its outer end. As shown in Figs. 11 and 11<sup>a</sup>, each pusher bar 78 is mounted to slide on a plate 87, the latter having a longitudinal slot 86 in which a block 85, connected to the bar 78, may slide. Pivotally carried at 76, by the plate 87, is a two-armed lever 75, the arms of which are of unequal length. The longer arm of lever 75 is held, by means of a spring 80, in the path of a plunger 81, movable in and arranged at one end of the vertical part of the way 59. The shorter arm of the lever is slotted at 82, at its lower end, and mounted in the slot 82 is a member 83, provided with an inwardly projecting pin 84, adapted to act against the block 85 to move the pusher bar 78 relatively to the plate 87. As the heads 61<sup>a</sup> of the rails 61 near the ends of their travel in either direction, they push the plungers 81 outwardly thus oscillating the levers 75 about their pivots 76 and causing the spring pressed pins 79 to advance the stacks of frames in the horizontal parts of the way 45 a suitable distance. To prevent excess movement of the pusher bars 78, the lower end of the member 83 is provided with a roller 88 adapted to run up an inclined abutment 89 carried by the plate 87, and raise the pin 84 out of contact with the block 85, thus stopping the advance movement of the bar 78. Upon retraction of the plungers 81, the springs 80 return the levers 75 to initial position, the shorter arm of lever 75 acting against pin 90, projecting from bar 78 through slot 86, to pull the bar 78 back to initial position. As the pin 79 of the bar 78 is beveled it can pass back to initial position over the rollers 44 of the frames 43, without moving the latter. As the frames 43 reach the vertical parts of the way 45, they are temporarily supported in suspended position, the means preferably employed for this purpose being spring controlled latches, those used at the front of the apparatus being designated generally as 92 and illustrated in Figs. 15 to 15$^b$, and those used at the rear of the apparatus being designated generally as 103 and illustrated in Fig. 13. A fuller description of these latches will be given in a subsequent part of the present specification.

As indicated by the arrows in Fig. 7 the individual frames descend at the front of the apparatus, and ascend at the rear thereof, the upper and lower horizontal parts of the way 45 serving to guide the stacks of frames from one side of the apparatus to the other. The heads 61$^a$ at the ends of the rear rail 61 carry the means (Fig. 12) for effecting the upward feed of the frames 43 at the rear of the apparatus, the means comprising a bolt 74 working in a suitable housing and normally held in protracted position by a coiled spring 74$^a$. The lower face of the bolt 74 is beveled, so as to allow it to pass over the rollers 48 of the frames 44, during the downward return movement of the rails 61.

Figs. 10 and 10$^a$ illustrate the means carried by the forward rail heads 61$^a$, by which the frames 44 are carried from the upper to the lower part of the apparatus. 63 is a housing provided with lateral elongated parallel slots 64 through which pins 65, carried by a bolt 62, project, the lower face of the bolt being beveled off, as shown. Springs 66 acting against the pins 65 have a normal tendency to retract the bolt 62, but this tendency is counteracted by a locking pin 67 having a locking plate 72 at its upper end, which locking plate is normally held in a position to lock the bolt 62 in protracted position, by means of an expansion spring 68. As the forward rail 61 has about completed its descent, the end of the locking pin 67 hits against an adjustable stop 69 carried by the plate 46, whereby the locking pin is forced inwardly against the tension of the spring 68, and the springs 65 retract the bolt 62, which remains retracted until during the ascent of the rail 61, a roller 70 on the rear of the bolt 62 contacts with a cam plate 71 carried by the plate 47, forcing the bolt outwardly until the locking plate 72 enters a recess 73 in the bolt and locks the latter in protracted position.

In Fig. 13 we have illustrated the means employed to retain the frames 44 temporarily suspended at the rear of the apparatus, such means including a bolt 103 carried in a suitable housing, and normally forced into protracted position by a retractile spring 103$^a$, the lower face of the bolt being beveled off, so that said bolt may be retracted by the ascending rollers 48 of the frames 44, thus permitting the rollers to pass the bolts and rest on the upper straight edges thereof.

The means for temporarily retaining the frames 44 suspended at the front of the apparatus is illustrated in Figs. 15 to 15$^b$ and will now be described. 92 is a bolt having its lower edge beveled as shown, a spring 93 being provided and having a normal tendency to retract the bolt within the casing 97. This tendency of the spring 93 is counteracted by a locking pin 94 having a projection 95 adapted to enter a recess 96 in the bolt 92. The pin 94 is depressed into locking position by a spring 98, and extends through a slot 99 in the bolt 92, the lower end of the pin 94 being in the path of a stop 100 (Fig. 7) adjustably carried by the heads 61$^a$ of the rail 61. Shortly before the rails 61 reach the limit of their upward travel, the stops 100 strike the locking pins 94 raising the latter, and permitting the spring 93 to retract the bolt 92. As the rails (which now carry the frames 44) descend, cam plates 101 carried by the heads 61$^a$, act against lateral pins 102 projecting outwardly from the bolts 92, forcing the bolts outwardly until the locking pins 94 snap back into position and hold the bolts in protracted position.

The operation of the modified form of the invention illustrated in Figs. 6 to 15$^b$ is as follows, it being understood that at the front of the apparatus successive placards are conveyed downwardly, at the rear of the apparatus successive placards are conveyed upwardly, at the top of the apparatus stacks of placards are moved from right to left and at the bottom of the apparatus the stacks are moved from left to right. Let it be assumed that the worm wheel 52 has completed one half of a revolution, elevating the rails 61 at the rear of the device, and depressing those at the front of the device. Each of the bolts 74 of the rear rail head 61ᵃ will carry the rollers 44 of the frames 43 resting on the upper vertical edge of the bolt. As the rollers 44 come opposite and into contact with the supporting bolts or latches 103, the latter will be forced inwardly against the tension of their springs 103ᵃ, and as the rollers 44 are slightly above the latches 103 the latter will snap forward into protracted position under the rollers 44, thus holding the frames suspended, one of the frames being in line with the upper vertical part of the way 45, while the other frame will be suspended in line with the display portion B of the device. At the front of the device the rails 61 have been lowered, and in the course of descent the bolts 62 are in protracted position, each thereof supporting the roller 44 of one of the frames 43. After the bolts 62 have received the rollers 44 from the suspending bolts 92 and in course of the descent of the rails 61, the cam plates 101 strike the pins 102 of the bolts 92 and again protract the latter into the path of the frames descending in the front, long part of the way 45. As the front rail 61 approaches the end of its downward travel, the locking pins 67 strike against the adjustable stops 69 whereby the bolts 62 are retracted, and the frames theretofore carried thereby are delivered into the lower vertical part of way 45, and to the intermediate supporting latch 92, respectively. Assuming, now, that the wheel 52 completes the second half of its revolution, the front rail 61 will be elevated and the rear rail 61 will be lowered. As the rear rail descends the latches 74 carried thereby will be forced inwardly by the rollers 44 resting on the supports 103 and the frames will not be carried down with the rails. When the rear rail has about reached its lowest position, the lowermost head 61ᵃ thereof impacts against the plunger 81, oscillating the lever 75 about its pivot and causing the pusher bar 78 to advance the lower stack of frames from left to right a distance equal to the width of the rollers 44 carried by the frames 43. At the front of the apparatus, as the rail 61 is elevated, the rollers 70 on the rear of the bolts 62 will pass under the cam plates 71 whereby the bolts 62 will be protracted and positioned to receive the rollers 44 of the frames 43 resting on the bolts 92 of the suspending means. Just before the bolts 62 come into line with the rollers 44 resting on the bolts 92, the stops 100 strike the ends of the locking pin 94 whereby the bolts 92 are retracted, moved out of the path of the ascending bolts 62 and caused to deliver the roller 44 of the frames 43 to the bolts 62. When the front rail 61 has completed its upward travel, the upper head 61ᵃ thereof impacts against the plunger 81, causing the upper lever 75 to oscillate about its pivot 76 and the pusher bar 78 to move the upper stack of frames a suitable distance to the left. At each advancing movement of each of the pushers 78, one of the frames 43 is positioned in one of the longer parts of the way, to be either elevated or lowered therein, as the case may be. A complete cycle of operation has been described above, and upon completion thereof the parts are in position for a repetition of this operation as long as power is applied to the wheel 52 from the motor 91.

In Figs. 14, 14ᵃ, 16 and 17 a modified form of drive for the frame conveying mechanism is illustrated, the principle of operation of this form of the device being similar to that of the modified form of invention above described. At the front and rear of the apparatus, we provide two endless chains 104, which run vertically over pulleys 105, bearing in the arms of the spiders 53. These chains are driven in the same direction, from the shaft 54, by means of the chains 106, and each chain 106 is provided with a pin 107 designed to work in a longitudinal slot formed in the reciprocatory carriages 108. This reciprocatory carriage effects the upward and downward feed of the frames 43 in the manner heretofore described, and a more detailed description is, therefore, deemed to be unnecessary.

What we claim as new and desire to secure by Letters Patent is:—

1. Display apparatus, embodying therein a continuous course or way, placard-supporting-frames having heads projecting through said way, reciprocatory carriages each having means for simultaneously engaging a plurality of said heads to advance successive frames edge to edge through certain parts of said way, and means for advancing stacks of frames face to face through other parts of said way, said last named means including a sliding bar having a projecting arm to engage said heads, means for advancing said sliding bar to engage the heads, and means for retracting said bar to initial position.

2. Display apparatus, embodying therein a continuous course or way, placard-supporting-frames having heads projecting through said way, reciprocatory carriages each having spring-pressed yieldingly-supported means for simultaneously engaging a plurality of said heads to advance successive frames edge to edge through certain parts of said way, and means for advancing stacks of frames face to face through other parts of said way, said last named means including a sliding bar having a projecting arm to engage said heads, means for advancing said sliding bar to engage the heads, and means for retracting said bar to initial position.

3. Display apparatus, embodying therein a continuous course or way, placard-supporting-frames having heads projecting through said way, carriages each having means for simultaneously engaging a plurality of said heads to advance successive frames edge to edge through certain parts of said way, rotary means for imparting reciprocatory movement to said carriages, and means for advancing stacks of frames face to face through other parts of said way, said last named means including a sliding bar having a projecting arm to engage said heads, means for advancing said sliding bar to engage the heads, and means for retracting said bar to initial position.

4. Display apparatus, embodying therein a continuous course or way, placard-supporting-frames having heads projecting through said way, slotted carriages having means for engaging said heads to advance successive frames edge to edge through certain parts of said way, rotary means having members entering the slots in the carriages for imparting reciprocatory movement to the latter, and means for advancing stacks of frames face to face through other parts of said way.

5. Display apparatus, embodying therein a horizontal bed having a continuous rectangular course or way formed therein, placard-supporting-frames having heads by means of which said frames are suspended in said way, reciprocatory means for advancing successive frames edge to edge in opposite directions through two parallel parts of said way, and means for advancing stacks of frames face to face through two other parallel parts of said way.

6. Display apparatus, embodying therein a horizontal bed having a continuous rectangular course or way formed therein, placard-supporting-frames having enlarged heads by means of which said frames are suspended in said ways, reciprocatory means for advancing successive frames edge to edge in opposite directions through two parallel parts of said way, and rotary means for advancing stacks of frames face to face through two other parallel parts of said way.

7. Display apparatus, embodying therein a horizontal bed having a continuous rectangular course or way formed therein, placard-supporting-frames having enlarged heads by means of which said frames are suspended in said way, carriages mounted to reciprocate over certain parts of said way, and having means for engaging said heads to advance successive frames in opposite directions through said parts of the way, and revoluble shafts having means for advancing stacks of frames in opposite directions through certain other parts of said way.

8. Display apparatus, embodying therein a horizontal bed having a continuous rectangular course or way formed therein, placard-supporting-frames having enlarged heads by means of which said frames are suspended in said way, carriages mounted to reciprocate over certain of said ways and having spring pressed dogs adapted to engage said heads and advance successive frames in opposite directions through said parts of the way, pusher bars arranged over the other parts of said way, and revoluble shafts having means for engaging said pusher bars to advance stacks of frames in opposite directions in other parallel parts of said way.

9. Display apparatus, embodying therein a horizontal bed having a continuous rectangular course or way formed therein, placard-supporting-frames having enlarged heads by means of which said frames are suspended in said way, carriages having slotted vertical posts and mounted to reciprocate over certain parts of said way, spring pressed dogs on said carriages engaging the heads of successive frames and adapted to advance the latter singly in certain parts of said way, rotary disks having pins working in the slots of the posts carried by said carriages whereby the latter are reciprocated over said parts of the way, pusher bars having means for engaging the frame-heads and arranged over certain other parts of said way, oppositely extending rotary shafts having means for engaging said pusher bars and thereby moving stacks of frames in opposite directions in the parts of the way over which said bars are arranged, and means for returning said bars to initial position after each advancing movement thereof.

HANS ECKSCHLAGER.
EMIL ECKSCHLAGER.

Witnesses:
AUGUST FUGGER,
ADA MARIA BERGER.

Copies of this patent may be obtained for five cents each, by addressing the "Commissioner of Patents. Washington, D. C."